Patented Oct. 23, 1951

2,571,995

UNITED STATES PATENT OFFICE 2,571,995

N,N'-DIACYL ARYL DISULFONAMIDES

David Aelony, Minneapolis, Minn., assignor to General Mills, Inc., a corporation of Delaware No Drawing. Application February 24, 1948, Serial No. 10,554

3 Claims. (Cl. 260—401)

The present invention relates to N,N$^1$-diacyl aryl disulfonamides and to a process of producing them. These compounds are insoluble in acid and are soluble in alkali. The compounds vary in properties, depending upon the particular substituents. The high molecular weight compounds, such as those derived from long chain fatty acid groups are waxy materials and are soluble in ammonia, volatile amines, and other alkalies, permitting the preparation of aqueous solutions of the waxes which may be applied in the form of an aqueous solution as distinguished from the aqueous suspensions commonly employed for waxes. Inasmuch as these waxes are soluble in alkali, they may be used as enteric pill coatings, preventing dissolution of the pills in the stomach but permitting solution in the intestines. They are also of value in textile finishes and may be precipitated as copper salts on textiles to prevent molding, or may be precipitated as aluminum salts to act as sizing or waterproofing agents. Alkali metal, ammonium, or amine salts of these compounds may be used as surface active agents.

It is, therefore, an object of the present invention to provide novel N,N$^1$-diacyl aryl disulfonamides which are alkali soluble and which are useful as waxes, surface active agents, and the like.

The compounds contemplated by the present invention are N,N$^1$-diacyl aryl disulfonamides. The following variations are possible in this group of compounds. The acyl groups are derived from fatty acids, and many contain from 8 carbon atoms up to 18, and more. Those from 8–18 carbon atoms are the most practical at the present time, inasmuch as there are relatively few fatty acids of more than 18 carbon atoms commercially available in any large quantity. Acyl groups of fatty acids of more than 18 carbon atoms may, of course, be used. Such acids may be derived from less common sources and may contain up to 30 carbon atoms. The aryl group is likewise subject to considerable variation. It may consist of a simple benzene ring, an alkyl substituted benzene ring such as the toluyl group, or a halogen substituted benzene ring such as a chlorphenyl group. Similarly the sulfonamide groups may be subject to variation insofar as position is concerned. The most practical method of preparing the aryl disulfonamides involves the reaction of aryl disulfonamide with acyl halides. According to this reaction, the sulfonamide groups assume a metaposition relative to each other. However, both the ortho- and para-disulfonamides may be prepared by other methods and are useful in the preparation of these compounds.

The following examples will serve to illustrate the invention:

Example 1

158 g. palmitoyl chloride, 68 g. benzene disulfonamide and 200 cc. CCl$_4$ were refluxed one week. The product was recrystallized once from butanol and once from ethanol. It has a tendency to gel in solvents. It was dried in vacuo yielding 148 g. translucent ammonia-soluble hard wax M. 136–7° C., per cent N 3.85 (theory 3.93), N. E. 357.6 (theory 356). The second crop weighed 20 g., M. 223–6° C., was apparently unchanged benzene sulfonamide. Thus, the yield on the basis of benzene disulfonamide used was almost quantitative.

Example 2

61 g. lauroyl chloride, 33 g. benzene disulfonamide and 300 cc. tetrachlorethane were refluxed 24 hours. The evolution of HCl was very rapid. The product was evaporated, dissolved in aqueous ammonia, precipitated with hydrochloric acid, filtered, washed and recrystallized from methanol. First fraction weighed 31.5 g., M. 112–27° C., per cent N 4.53 (theory 4.66). Second fraction weighed 4 g., M. 110–7° C., per cent N 4.80, third fraction weighed 13 g., M. 110–25° C., per cent N 9.18.

While various modifications of the present invention have been described, it is to be understood that the same is not limited thereto, but may be varied within the scope of the following claims.

I claim as my invention:

1. N,N$^1$-diacyl aryl disulfonamides in which the acyl groups correspond to the acyl groups of fatty acids containing from 8–18 carbon atoms.
2. N,N$^1$-dipalmitoyl benzene disulfonamide.
3. N,N$^1$-dilauroyl benzene disulfonamide.

DAVID AELONY.

REFERENCES CITED

The following references are of record in the file of this patent:

UNITED STATES PATENTS

| Number | Name | Date |
|---|---|---|
| 2,345,121 | Hentrich et al. | Mar. 28, 1944 |
| 2,416,890 | Amende | Mar. 4, 1947 |